United States Patent
Borsarelli et al.

(10) Patent No.: US 7,278,529 B2
(45) Date of Patent: Oct. 9, 2007

(54) PUSH METHOD AND DEVICE FOR TRANSFERRING GLASS ARTICLES

(75) Inventors: Gianclaudio Borsarelli, Cuneo (IT); Carlo Sesia, Cuneo (IT); Bruno Viada, Madonna Delle Grazie (IT)

(73) Assignee: Bottero S.p.A. (IT)

( * ) Notice: Subject to any disclaimer, the term of this patent is extended or adjusted under 35 U.S.C. 154(b) by 0 days.

(21) Appl. No.: 11/539,500

(22) Filed: Oct. 6, 2006

(65) Prior Publication Data

US 2007/0144213 A1   Jun. 28, 2007

(30) Foreign Application Priority Data

Oct. 7, 2005  (IT)  ................. TO2005A000713 13

(51) Int. Cl.
*B65G 47/26* (2006.01)
(52) U.S. Cl. .................. 198/429; 198/430; 65/260
(58) Field of Classification Search ............... 198/429, 198/430, 432, 597, 598, 468.01; 414/744.4, 414/744.6; 65/260, 239, 241, 375
See application file for complete search history.

(56) References Cited

U.S. PATENT DOCUMENTS

| | | | |
|---|---|---|---|
| 4,502,721 A * | 3/1985 | Savin-Czeizler et al. | .... 294/1.1 |
| 4,927,444 A | 5/1990 | Voisine | |
| 5,429,651 A * | 7/1995 | Bolin | ........................ 65/241 |
| 5,988,355 A | 11/1999 | Merour | |
| 5,992,612 A * | 11/1999 | Sidler et al. | ................ 198/430 |
| 6,494,063 B1 | 12/2002 | Malek | |
| 6,601,410 B1 * | 8/2003 | Bogert et al. | ................ 65/260 |

FOREIGN PATENT DOCUMENTS

| | | |
|---|---|---|
| DE | 29922204 U1 | 5/2000 |
| EP | 1213487 A1 | 6/2002 |
| EP | 06121925.9 | 1/2007 |
| GB | 2292551 A | 2/1996 |

* cited by examiner

*Primary Examiner*—James R. Bidwell
(74) *Attorney, Agent, or Firm*—Sheridan Ross P.C.

(57) ABSTRACT

A method and device for transferring glass articles from an intermediate supporting plate to an unloading conveyor, wherein the article to be transferred is positioned and retained inside a seat on a movable member by feeding compressed air through the movable member; the compressed air being fed in close to an edge of a dihedron formed by two plates of the movable member, and being oriented upwards towards the article to divide the incoming compressed air into two lateral streams laterally and at least partly surrounding the article, and into an upward-directed rear stream.

18 Claims, 3 Drawing Sheets

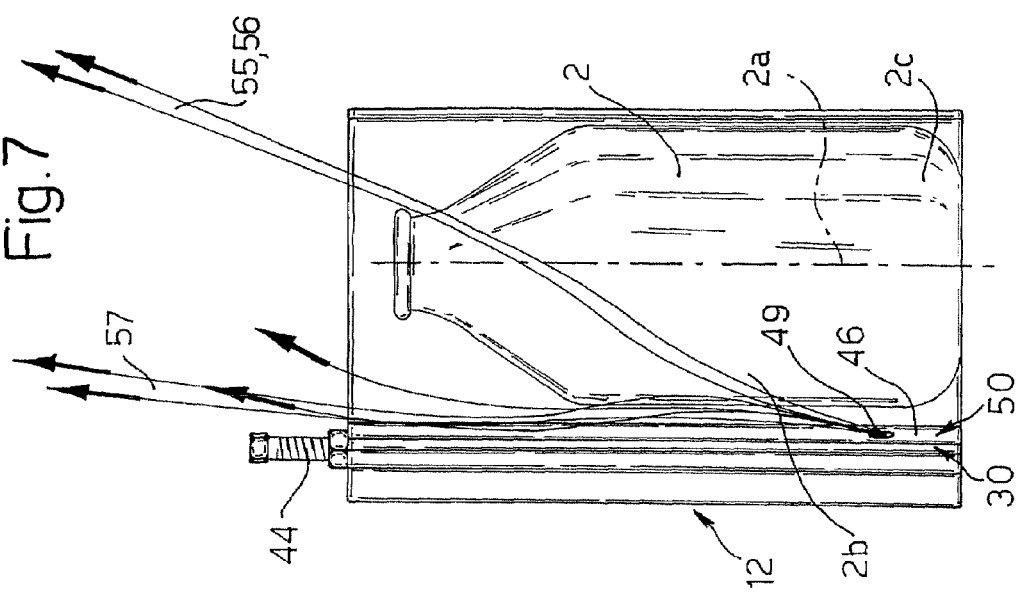
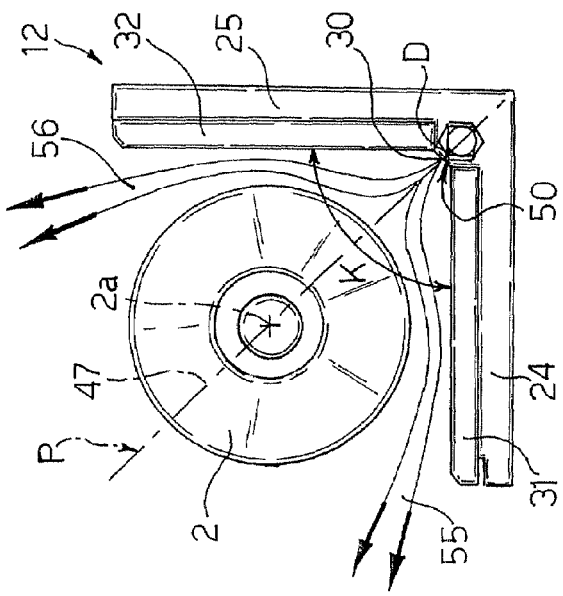
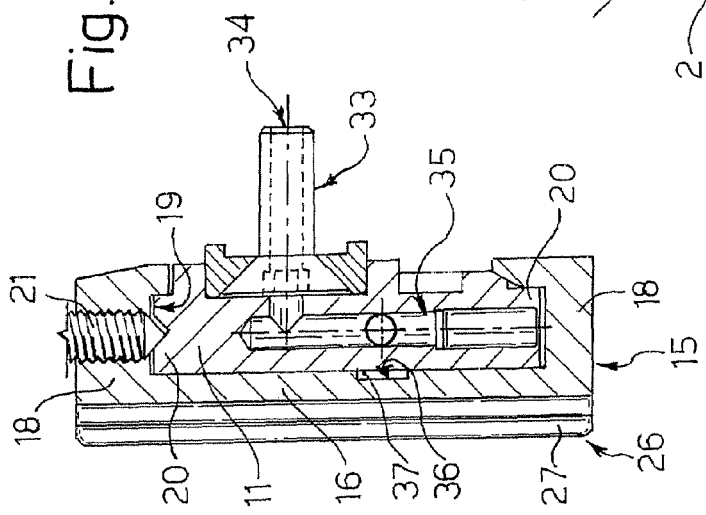

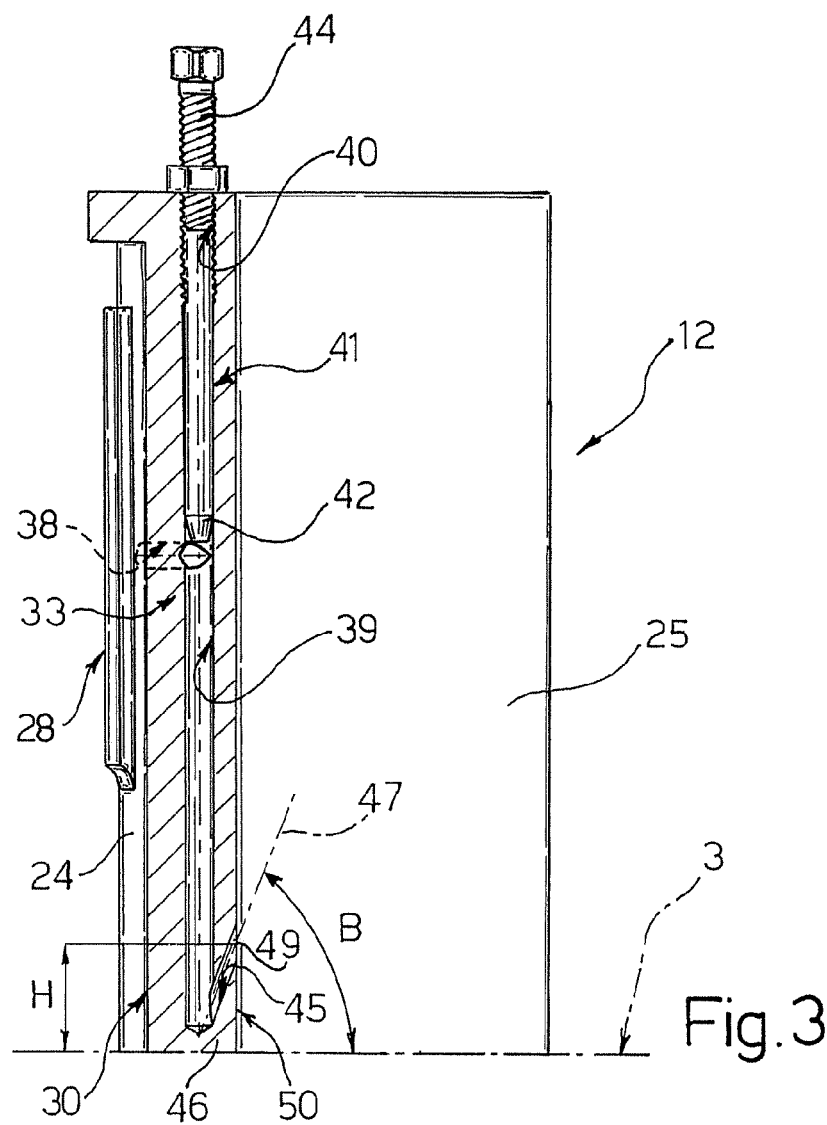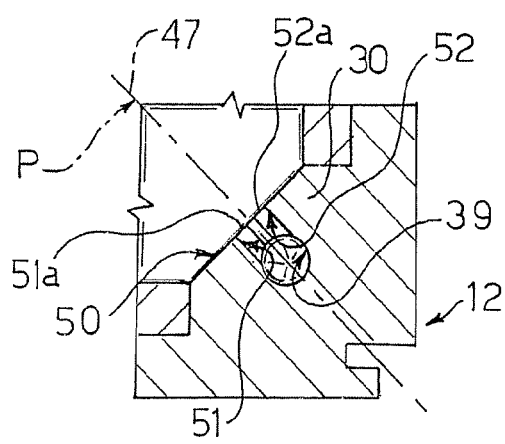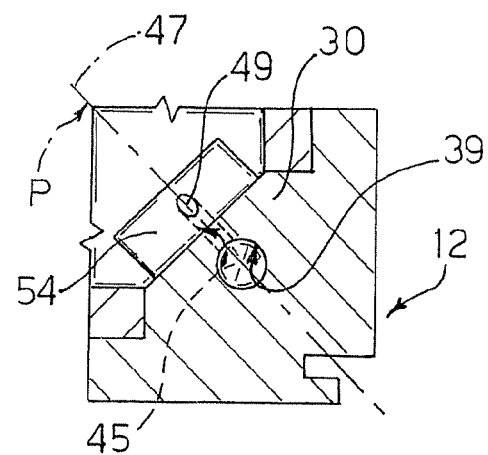
Fig. 3
Fig. 4
Fig. 5

PUSH METHOD AND DEVICE FOR TRANSFERRING GLASS ARTICLES

The present invention relates to a method of transferring glass articles on an I.S. machine.

BACKGROUND OF THE INVENTION

On machines for producing hollow glass articles, particularly bottles, the bottles produced on each line are transferred from the relative finishing mold onto a relative horizontal supporting plate or surface, from which they are transferred onto an unloading conveyor by means of a push device which moves the bottles along a 90° arc.

The push device comprises a comblike transfer member having one or more compartments, each for housing a respective bottle and bounded by a rear wall and a lateral wall crosswise to the rear wall. As the transfer member rotates along said arc, each bottle is retained inside the respective compartment by a stream of compressed air issuing from an opening normally located at a free end of the lateral wall of the compartment and oriented to produce a stream of retaining air parallel to the supporting plate and directed onto a bottom portion of the bottle to force the bottle into the corner formed by the rear wall and the lateral wall.

Though adopted, some known solutions fail to provide for retaining the bottle inside the compartment regardless of the shape/size of the bottle and the initial position of the bottle with respect to the transfer member. Whereas, in others, the air blown onto the bottle damages the outer surface of the bottle, thus reducing the quality of the finished product. Serious problems arise, in particular, when the conveyor belt exceeds a given threshold speed, e.g. fifty metres a minute; in which case, the article is transferred at such a rotation speed that the centrifugal force acting on the article is greater than the friction between the article and the supporting surface, with the result that the article is spun off the transfer member.

SUMMARY OF THE INVENTION

It is an object of the present invention to provide a push method designed to position and retain the glass articles precisely and reliably inside the compartments, as they are transferred onto the conveyor, regardless of the geometric characteristics of the articles and of their position on the supporting plate, and to prevent collision of the articles with the walls of the transfer member in any transfer condition.

According to the present invention, there is provided a method of transferring glass articles from an intermediate supporting plate to an unloading conveyor; the method comprising the steps of positioning the article inside a seat on a transfer member, and retaining the article inside said seat as the transfer member moves between the intermediate supporting plate and the unloading conveyor; positioning and retaining said article inside said seat comprising the steps of feeding compressed air into said seat through said transfer member; and the method being characterized in that said compressed air is fed into a portion of said seat located close to an edge of a dihedron formed by two plates of said transfer member, and is oriented upwards towards said article to divide the incoming compressed air into two lateral streams laterally and at least partly surrounding said article, and into an upward-directed rear stream.

In the method defined above, said incoming compressed air is preferably directed upwards to produce said lateral streams at least during said step of positioning said article inside said seat, and said rear stream at least during a step of transferring the article between said intermediate supporting plate and said unloading conveyor.

The present invention also relates to a push device for transferring glass articles.

According to the present invention, there is provided a push device for transferring glass articles from an intermediate supporting plate to an unloading conveyor according to the method claimed in the attached Claims; the push device comprising a transfer member defining at least one seat for a respective said article, and actuating means for moving said transfer member between said intermediate supporting plate and said unloading conveyor; said transfer member comprising a bottom plate and a lateral plate defining a dihedron, and a supply circuit for supplying a stream of compressed air and extending through said transfer member to position and retain said article inside said seat as the transfer member moves between the intermediate supporting plate and the unloading conveyor; the device being characterized in that said supply circuit has an outlet located close to an edge of said dihedron formed by said plates, and designed to direct said stream of compressed air onto said article in a direction forming an angle of other than zero with said intermediate supporting plate.

BRIEF DESCRIPTION OF THE DRAWINGS

A non-limiting embodiment of the invention will be described by way of example with reference to the accompanying drawings, in which:

FIG. 2 shows a larger-scale section along line II-II in FIG. 1;

FIG. 3 shows a larger-scale section along line III-III in FIG. 1;

FIGS. 4 and 5 show sections, with parts removed for clarity, of two variations of a detail in FIG. 3;

FIGS. 6 and 7 show a detail of FIG. 1 in two different operating conditions.

DETAILED DESCRIPTION OF THE INVENTION

Figure 1:
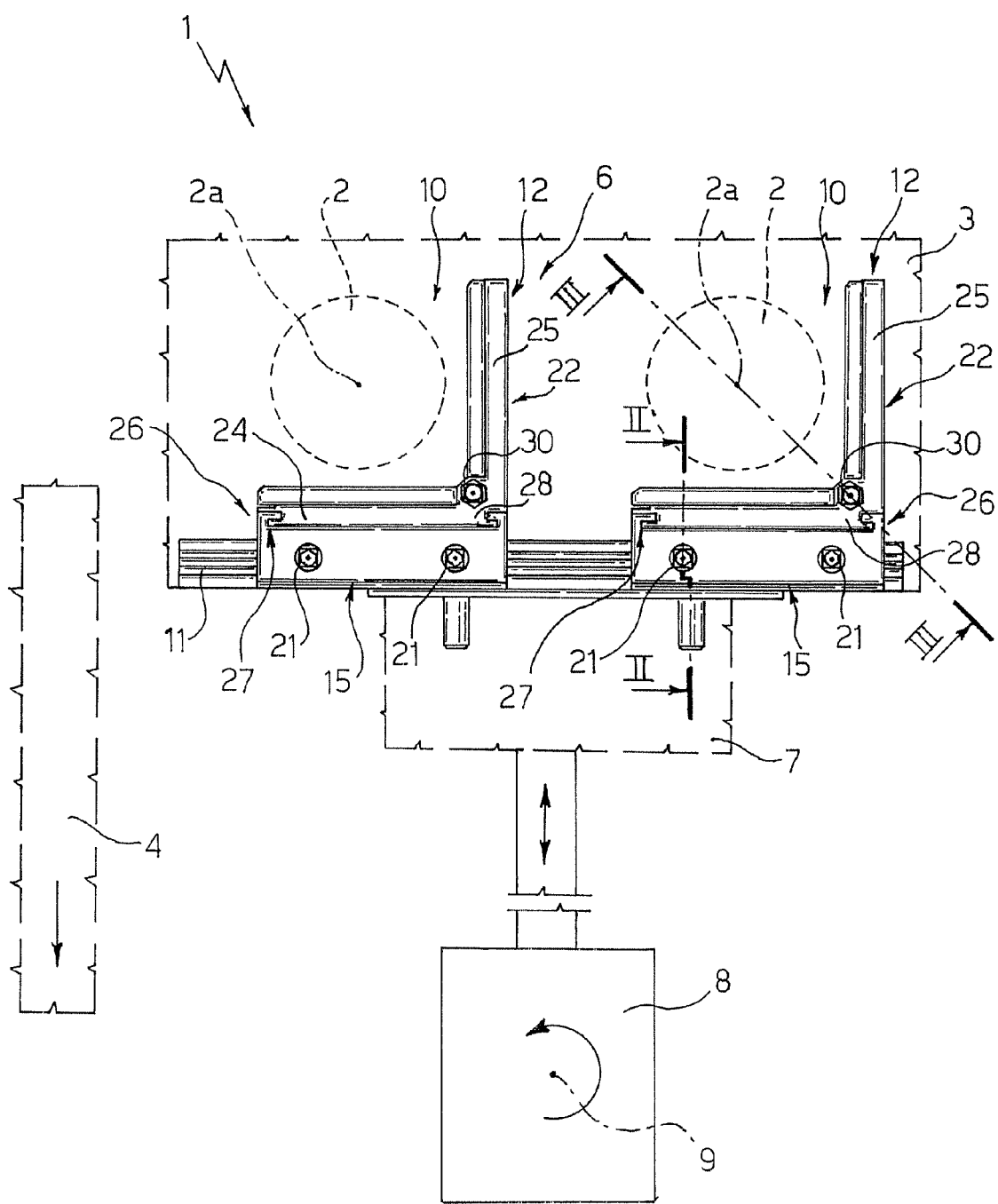
FIG. 1 shows a schematic plan view of a preferred embodiment of a push device in accordance with the teachings of the present invention.

Number 1 in FIG. 1 indicates as a whole a push device for transferring glass articles 2 from a horizontal intermediate supporting plate 3, commonly referred to as a "dead plate", to a known unloading conveyor 4 shown schematically in FIG. 1.

In the example described, device 1 comprises a compartmented transfer assembly 6 connected integrally to a free end of a movable member 7 of a known pneumatic linear actuator 8 for moving transfer assembly 6 between a withdrawn position, and a forward position (FIG. 1) in which transfer assembly 6 extends over supporting plate 3. Actuator 8 is fitted to a turntable (not shown) to rotate in opposite directions about a vertical axis 9, perpendicular to supporting plate 3, to move transfer assembly 6 and hence articles 2 between supporting plate 3 and conveyor 4.

With reference to FIG. 1, transfer assembly 6 comprises two compartments or seats 10, each for a respective article 2; and a cross member 11 parallel to supporting plate 3 and connected integrally in known manner to a free axial end of movable member 7 of linear actuator 8. Cross member 11 supports two separate, side by side transfer members 12, each defining a seat 10 for a respective article 2, and each fitted to cross member 11, adjustably along cross member 11 independently of the other transfer member 12, by a respective C-section interface body 15.

As shown in FIG. 2, each interface body 15 comprises a flat intermediate wall 16 contacting cross member 11 and located on the opposite side of cross member 11 to movable member 7 of actuator 8; and two lateral coupling portions 18, each defining a slide seat 19 for a respective lateral portion 20 of cross member 11. Each interface body 15 is locked to cross member 11 in an adjustable reference position by two lock pins 21 on lateral portions 18.

With reference to FIGS. 1 and 2, each intermediate wall 16 is fitted with relative transfer member 12, which comprises a square or L-shaped body 22, in turn comprising a bottom wall 24 parallel to and facing relative intermediate wall 16, and a lateral wall 25 perpendicular to bottom wall 24. Each bottom wall 24 is fitted to relative interface body 15 by a respective guide-slide retaining assembly 26 which, in the example described, comprises a C-section guide 27 perpendicular to supporting plate 3 and integral with relative interface body 15; and a T-section slide 28, also shown partly in FIG. 3, which engages relative guide 27 and is integral with bottom wall 24.

With reference to FIGS. 1 and 3, each transfer member 12 also comprises a corner portion 30 integral with walls 24 and 25, and on which rest two known protection plates 31 and 32 located inside seat 10 and parallel to and lining respective walls 24 and 25.

Push device 1 also comprises a pneumatic compressed-air circuit 33 for positioning each article 2 inside respective seat 10, and for retaining articles 2 inside seats 10 as articles 2 are transferred from intermediate supporting plate 3 to conveyor 4.

Pneumatic circuit 33 has a compressed-air inlet 34 formed in cross member 11, on the side facing linear actuator 8, and connected to a supply source not shown; and, for each transfer member 12, an intermediate conduit 35 extending through cross member 11 and terminating in a horizontal groove 36 (FIG. 2) formed in relative interface body 15 and defining, with cross member 11, an air chamber 37 forming part of pneumatic circuit 33. Air chamber 37 communicates, via a passage 38 (FIG. 3), with a vertical dead hole 39 formed, perpendicular to plate 3, in corner portion 30 from the top end of corner portion 30, as shown in FIG. 3. Dead hole 39 has an internally threaded top inlet 40, into which is screwed an intermediate portion of an air flow regulating rod 41. And rod 41 also comprises a shutter portion 42 inserted inside dead hole 39 to adjust the air supply; and an outer operating end portion 44 extending outside hole 39.

Dead hole 39 communicates with a straight outflow conduit 45 (FIGS. 3 and 5) which extends, inside a bottom end portion 46 of corner portion 30 close to supporting plate 3, in a compressed-air feed direction 47 sloping with respect to supporting plate 3 by an angle B adjustable between twenty and ninety degrees (FIG. 5). Direction 47 lies in a plane P (FIGS. 4-6), which is perpendicular to supporting plate 3, bisects the dihedral angle K formed by plates 31 and 32, and intersects a vertical axis of symmetry 2a of article 2, so that direction 47 also intersects the axis of symmetry 2a of article 2. Conduit 45 has an outlet 49, which is formed through a front surface 50 of portion 46 forming a 45° angle with plates 31 and 32 and extending perpendicular to supporting plate 3. In the example described, outlet 49 is formed at a height H (FIG. 3) adjustable between ten and a hundred millimetres with respect to supporting plate 3, depending on the type of article being transferred. Alternatively, in a variation shown in FIG. 4, dead hole 39 communicates with two separate conduits 51 and 52, both sloping with respect to supporting plate 3 by an angle equal to angle B, and having respective outlets 51a and 52a located symmetrically on opposite sides of bisector plane P to direct respect streams of compressed air in directions lying in respective planes parallel to plane P or intersecting axis 2a of article 2.

In the FIG. 5 variation, each outlet 49 is formed in a base portion 54 of relative transfer member 12 projecting from portion 46 towards article 2 and substantially contacting supporting plate 3; and each outlet 49 is designed to supply a stream of compressed air in direction 47 at all times. Alternatively, in a further variation not shown, both outlets 51a and 52a are formed in base portion 54.

Operation of device 1 will now be described with reference to one transfer member 12 for the sake of simplicity, and assuming only one article 2 is positioned on supporting plate 3, and actuator 8 is set to maintain transfer assembly 6 in the withdrawn position facing article 2.

As of the above condition, actuator 8 is operated to move transfer member 12 into the forward position at least partly surrounding article 2.

Once member 12 is in the forward position, inlet 34 of pneumatic circuit 33 is connected to the compressed air source, and a mass of compressed air is fed into seat 10 by circuit 35 and outlet 49 or outlets 51a and 52a.

With reference to FIGS. 6 and 7, the compressed air fed into seat 10 from outlet 49 strikes the wall of the article and is divided into two lateral streams 55 and 56, which flow between article 2 and plates 31 and 32 respectively, and continue upwards and outwards of the seat (FIG. 7), substantially in contact with a lateral surface of article 2. The constriction in the airflow section in this area produces an increase in airflow speed and a consequent fall in pressure (Venturi effect), thus drawing article 2 towards plates 31 and 32. As article 2 is drawn towards plates 31 and 32, the two lateral air streams diminish, and a rear air stream 57 (FIG. 7) is gradually produced, which flows inside a rear chimney bounded by plates 31 and 32 on one side, and by article 2 on the other. The rear air stream assists in producing a depression behind article 2 and so further retaining article 2 inside the seat. At the positioning step, rear stream 57 predominates as article 2 is drawn towards plates 31, and 32, whereas the lateral streams gradually diminish until the article is positioned practically contacting plates 31 and 32. Adjusting angle B adjusts the ratio between the air streams on either side of the article and the vertical air stream, and so adjusts the attraction and positioning force with respect to the subsequent retaining force.

In an alternative operating mode, the slope of incoming air direction 47, the incoming air pressure, and the height H of the outlet with respect to supporting plate 3, are adjusted according to the characteristics of the article to create a condition of equilibrium in which both lateral air streams 55, 56 and rear air stream 57 are present. Article 2 is thus surrounded laterally by a cushion of compressed air, and can be transferred with minimum risk of it colliding directly with plates 31 and 32.

Once article 2 is positioned and retained inside seat 10 in the desired position, actuator 8 is rotated, anticlockwise in FIG. 1, about axis 9 to deposit the article on conveyor 4. Once, or a given time before, the article is deposited on the conveyor, inlet 34 is cut off from the compressed-air source, and the article is released on conveyor 4.

The same operations apply when outlet 49 is formed in base portion 54, and when outlet 49 is replaced by outlets 51a and 52a; in which case, each outlet 51a, 52a first produces a respective lateral air stream, and then assists in forming the rear air stream.

As compared with known solutions, the push method and device 1 described therefore provide for transferring any type of article safely at high speed, with no impairment in the geometric and dimensional characteristics or appearance of the articles. This is substantially due to the compressed air, unlike known solutions, being fed into a portion of seat 10 close to an edge D of the dihedron formed by plates 31 and 32 defining seat 10, i.e. behind the article, but above all in a direction sloping with respect to the supporting plate, so that the incoming air impinges on a mid-portion 2b of article 2 above a bottom portion 2c of article 2 (FIG. 7). Positioning and retention are further improved by the air feed direction lying in a plane also containing the axis of symmetry of the article being transferred, and by the fact that two substantially equal streams of compressed air are produced on opposite sides of the article at least at the positioning step, and a retaining-force-producing rear stream is always present at the transfer step to retain the article inside the seat.

As will be clear from the above description, unlike known solutions, the compressed air impinges directly on the article without producing any damage or change in the lateral surface of the article on supporting plate 3. That is, as stated, as opposed to impinging radially or frontally on the lateral surface of article 2, the various streams of compressed air impinge in a direction sloping with respect to the lateral surface, and gradually adhere to the lateral surface with no scoring or local deformation.

Clearly, changes may be made to device 1 as described herein without, however, departing from the scope of the present invention. In particular, changes may be made to transfer assembly 6 to define a number of seats other than that shown by way of example, and also to the compressed-air supply circuit. In particular, the outlets may differ in number and location from those described, while still directing compressed air upwards onto the back or a rear portion of the article, and still dividing the incoming compressed air as described.

Finally, transfer members 12 may have no protective plates 31 and 32, and themselves define dihedral angle K.

The invention claimed is:

1. A method of transferring glass articles from an intermediate supporting plate to an unloading conveyor; the method comprising the steps of positioning the article inside a seat on a transfer member, and retaining the article inside said seat as the transfer member moves between the intermediate supporting plate and the unloading conveyor; positioning and retaining said article inside said seat comprising the steps of feeding compressed air into said seat through said transfer member; and the method being characterized in that said compressed air is fed into a portion of said seat located close to an edge of a dihedron formed by two plates of said transfer member, and is oriented upwards towards said article to divide the incoming compressed air into two lateral streams laterally and at least partly surrounding said article, and into an upward-directed rear stream.

2. A method as claimed in claim 1, characterized in that said incoming compressed air is directed upwards to produce said lateral streams at least during said step of positioning said article inside said seat, and said rear stream at least during a step of transferring the article between said intermediate supporting plate and said unloading conveyor.

3. A method as claimed in claim 1, characterized in that said compressed air is oriented to impinge on a mid-portion of said article above a bottom portion of the article.

4. A method as claimed in claim 1, characterized in that positioning and retaining said article inside said seat comprise the steps of feeding at least one stream of compressed air into said seat in a direction lying in a plane parallel to a plane bisecting said dihedron.

5. A method as claimed in claim 4, characterized in that said stream of compressed air is fed into said seat in a direction lying in a plane bisecting said dihedron.

6. A method as claimed in claim 1, characterized in that positioning and retaining said article inside said seat comprise the steps of feeding at least one stream of compressed air into said seat in a direction intersecting a vertical axis of symmetry of said article.

7. A push device for transferring glass articles from an intermediate supporting plate to an unloading conveyor in accordance with the method claimed in claim 1; the push device comprising a transfer member defining at least one seat for a respective said article, and actuating means for moving said transfer member between said intermediate supporting plate and said unloading conveyor; said transfer member comprising a bottom plate and a lateral plate defining a dihedron, and a supply circuit for supplying a stream of compressed air and extending through said transfer member to position and retain said article inside said seat as the transfer member moves between the intermediate supporting plate and the unloading conveyor; the device being characterized in that said supply circuit has at least one outlet located close to an edge of said dihedron formed by said plates, and designed to direct said stream of compressed air onto said article in a direction forming an angle of other than zero with said intermediate supporting plate.

8. A device as claimed in claim 7, characterized in that said stream of compressed air impinges on a mid-portion of said article above a bottom portion of the article.

9. A device as claimed in claim 7, characterized in that said direction lies in a plane perpendicular to said intermediate supporting plate and parallel to a vertical axis of symmetry of said article.

10. A device as claimed in claim 9, characterized in that said direction and the vertical axis of said article both lie in a plane bisecting said dihedron.

11. A device as claimed in claim 7, characterized in that said direction forms, with said intermediate supporting plate, an angle adjustable between 20 and 90 degrees.

12. A device as claimed in claim 7, characterized in that said outlet is formed above said intermediate supporting plate and facing an intermediate portion of said article above the bottom portion of the article.

13. A device as claimed in claim 7, characterized in that said transfer member comprises a corner base portion facing said intermediate supporting plate; said outlet being formed in said corner base portion.

14. A device as claimed in claim 7, characterized in that said compressed-air supply circuit comprises a straight outflow conduit coaxial with said direction and terminating with said outlet.

15. A device as claimed in claim 14, characterized in that said outflow conduit is formed in a corner portion of said transfer member located in the corner formed by said lateral plate and said bottom plate.

16. A device as claimed in claim 7, characterized by comprising a linear actuator having a movable member for moving said transfer member between a withdrawn rest position and a forward work position; a cross member fitted to said movable member; and a connecting member connecting the transfer member to said cross member; the connecting member being adjustable in position along the cross member; and said compressed-air supply circuit extending along said cross member and through said connecting member.

17. A device as claimed in claim 16, characterized by comprising releasable fast-fit coupling means interposed between said connecting member and said transfer member.

18. A device as claimed in claim 16, characterized by comprising at least two separate said transfer members fitted to said cross member; each said transfer member comprising a respective connecting member independent of the connecting member of the other transfer member.

* * * * *

UNITED STATES PATENT AND TRADEMARK OFFICE
CERTIFICATE OF CORRECTION

PATENT NO. : 7,278,529 B2 Page 1 of 1
APPLICATION NO. : 11/539500
DATED : October 9, 2007
INVENTOR(S) : Borsarelli et al.

It is certified that error appears in the above-identified patent and that said Letters Patent is hereby corrected as shown below:

On the title page of the patent, in the Foreign Application Priority Data section "TO2005A000713 13" should read --TO2005A000713--

Signed and Sealed this

Third Day of June, 2008

JON W. DUDAS
*Director of the United States Patent and Trademark Office*